(12) United States Patent
Tsai

(10) Patent No.: US 10,913,312 B1
(45) Date of Patent: Feb. 9, 2021

(54) CASTER ASSEMBLY

(71) Applicant: Po-Chuan Tsai, Tainan (TW)

(72) Inventor: Po-Chuan Tsai, Tainan (TW)

( * ) Notice: Subject to any disclaimer, the term of this patent is extended or adjusted under 35 U.S.C. 154(b) by 0 days.

(21) Appl. No.: 16/702,110

(22) Filed: Dec. 3, 2019

(51) Int. Cl.
*B60B 33/00* (2006.01)
*B60B 33/04* (2006.01)

(52) U.S. Cl.
CPC ...... *B60B 33/0028* (2013.01); *B60B 33/0042* (2013.01); *B60B 33/0086* (2013.01); *B60B 33/045* (2013.01)

(58) Field of Classification Search
CPC ............ B60B 33/0028; B60B 33/0047; B60B 33/0049; B60B 33/0057; B60B 33/0042; B60B 33/0086; B60B 33/045
See application file for complete search history.

(56) References Cited

U.S. PATENT DOCUMENTS

| | | | | |
|---|---|---|---|---|
| 4,807,328 A * | 2/1989 | Hezel | ...................... | B60B 33/00 16/18 R |
| 4,821,369 A * | 4/1989 | Daniels | ............... | B60B 33/0042 16/35 R |
| 5,259,088 A * | 11/1993 | Yang | .................... | B60B 33/0042 16/33 |
| 5,537,715 A * | 7/1996 | Yang | .................... | B60B 33/0042 16/35 R |
| 6,357,077 B1 * | 3/2002 | Jones, Jr. | ............. | B60B 33/045 16/35 D |
| 7,647,673 B2 * | 1/2010 | Melara | ................... | B60B 33/001 16/35 R |
| 8,561,258 B2 * | 10/2013 | Breyer | .................... | B60B 3/048 16/46 |
| 9,216,616 B2 * | 12/2015 | Melara | ................ | B60B 33/0028 |
| 10,035,376 B2 * | 7/2018 | Stoehr | ................ | B60B 33/0057 |
| 2005/0081329 A1 * | 4/2005 | Tsai | .................... | B60B 33/0073 16/18 R |
| 2008/0163455 A1 * | 7/2008 | Tsai | .................... | B60B 33/0049 16/46 |
| 2010/0186192 A1 * | 7/2010 | Trivini | ...................... | B60B 7/04 16/25 |
| 2011/0203074 A1 * | 8/2011 | Trivini | ............... | B60B 33/0049 16/45 |
| 2019/0160867 A1 * | 5/2019 | Wang | ................. | B60B 33/0028 |
| 2020/0369083 A1 * | 11/2020 | Stoehr | ................ | B60B 33/0068 |

FOREIGN PATENT DOCUMENTS

CN             100441428 C     12/2008

* cited by examiner

*Primary Examiner* — Jeffrey O'Brien
(74) *Attorney, Agent, or Firm* — Burris Law, PLLC

(57) ABSTRACT

A caster assembly includes a base body, a tubular member, a retaining member and two wheel units. The base body includes an inner surrounding surface, a through hole surrounded by the inner surrounding surface, and a positioning slot extending along a line tangent to the inner surrounding surface and communicating with the through hole. The tubular member is inserted into the through hole. The retaining member is inserted into the positioning slot to retain the tubular member within the through hole. The wheel units are respectively and rotatably sleeved on two lateral connection portions of the tubular member.

7 Claims, 7 Drawing Sheets

CASTER ASSEMBLY

FIELD

The disclosure relates to a caster assembly, more particularly to a caster assembly having a hollow configuration.

BACKGROUND

An existing caster assembly includes a wheel seat and a wheel rotatably connected to the wheel seat. Because an axis of the wheel has to be rotatably connected to the wheel seat, the existing caster assembly cannot be designed to have a hollow configuration. A caster assembly, as disclosed in Chinese Patent No. CN100441428C, has a hollow configuration and includes a hollow base body, a tubular member inserted into the base body and having two opposite cylindrical portions, and two wheels respectively and rotatably sleeved on the cylindrical portions. To ensure that the tubular member will not move left and right and will not rotate relative to the base body, an outer circumferential surface of the tubular member is provided with an annular recess and two tangent surfaces. The base body has an inner circumferential surface formed with an annular ridge engageable with the annular recess, and two flat surfaces respectively abutting against the tangent surfaces. By virtue of the engagement between the annular recess and the annular ridge, the tubular member is limited from moving horizontally relative to the base body, and by virtue of the abutment between the tangent surfaces and the flat surfaces, the tubular member is prevented from rotating relative to the base body.

Although the aforesaid caster assembly has a hollow configuration, because the tubular member and the base body are engaged with each other through the engagement between the recess and the ridge, the ridge and the tubular member are forced to resiliently deform to allow insertion of the tubular member into the base body during assembly. The caster assembly is not only difficult to assemble, in order to allow the tubular member to be smoothly assembled into the base body, the tubular member and the base body must be made from a material having sufficient resiliency. This results in reducing the strength of the caster assembly.

SUMMARY

Therefore, an object of the present disclosure is to provide a caster assembly that can overcome at least one of the drawbacks of the prior art.

Accordingly, a caster assembly of this disclosure includes a base body, a tubular member, a retaining member, and two wheel units. The base body includes an inner surrounding surface, a through hole extending through the base body and surrounded by the inner surrounding surface, and a positioning slot extending along a line tangent to the inner surrounding surface and communicating with the through hole. The tubular member is inserted into the through hole, and includes a fixing portion connected to the inner surrounding surface, and two lateral connection portions respectively extending from two opposite ends of the fixing portion and exposed from the base body. The fixing portion has an outer circumferential surface, and a receiving groove indented into the outer circumferential surface and communicating with the positioning slot. The retaining member is inserted into the positioning slot, and is partially and engagingly received in the receiving groove to retain the tubular member within the through hole. The wheel units are respectively and rotatably sleeved on the lateral connection portions.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
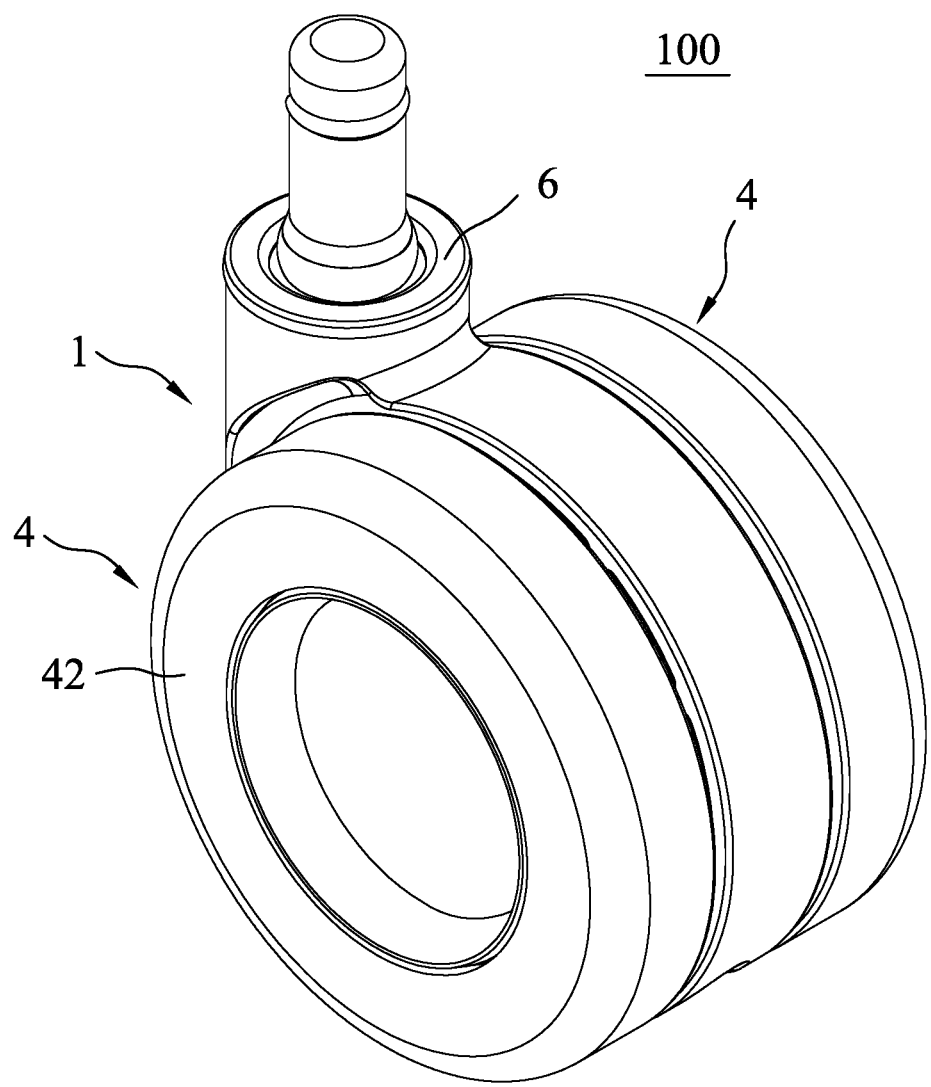
FIG. 1 is a perspective view of a caster assembly according to an embodiment of the present disclosure.

Referring to FIGS. 1 to 4, a caster assembly 100 according to an embodiment of the present disclosure is shown to include a base body 1, a tubular member 2, a retaining member 3, two wheel units 4, a stopping unit 5, and a mount seat 6.

The base body 1 includes an inner surrounding surface 11 defining an axis, a through hole 101 extending axially through the base body 1 and surrounded by the inner surrounding surface 11, an outer surrounding surface 12 radially opposite to and surrounding the inner surrounding surface 11, and two axially opposite side walls 13 each connected between the inner and outer surrounding surfaces 11, 12. The inner surrounding surface 11 has a vertically extending flat section 111, and a curve section 112 connected to two opposite ends of the flat section 111 and cooperating with the flat section 111 to define the through hole 101.

The base body 1 further includes a positioning slot 102 and a threaded hole 103. The positioning slot 102 is opposite to the flat section 111, extends upward through the curve section 112 from a bottom of the outer surrounding surface 12 along a line tangent to the curve section 112, and partially communicates with the through hole 101. Specifically, the positioning slot 102 has a bottom end disposed at the bottom of the outer surrounding surface 12. The threaded hole 103 is spaced apart from the positioning slot 102, extends upward from the bottom of the outer surrounding surface 12, and extends through the through hole 101 to communicate with the same.

The tubular member 2 is inserted into the through hole 101, and includes a fixing portion 21 connected to the inner surrounding surface 11, and two lateral connection portions 22 respectively extending from two opposite ends of the fixing portion 21 and exposed from the base body 1. The fixing portion 21 has an outer circumferential surface 210, and a receiving groove 211 indented into the outer circumferential surface 210 and communicating with the positioning slot 102. The outer circumferential surface 210 has a rotation-prevention plane section 212 facing and abutting against the flat section 111.

The retaining member 3 is inserted upward into the positioning slot 102 through the bottom end thereof, and is partially and engagingly received in the receiving groove 211 to retain the tubular member 2 within the through hole 101. In this embodiment, the retaining member 3 is a cylinder.

Figure 2:
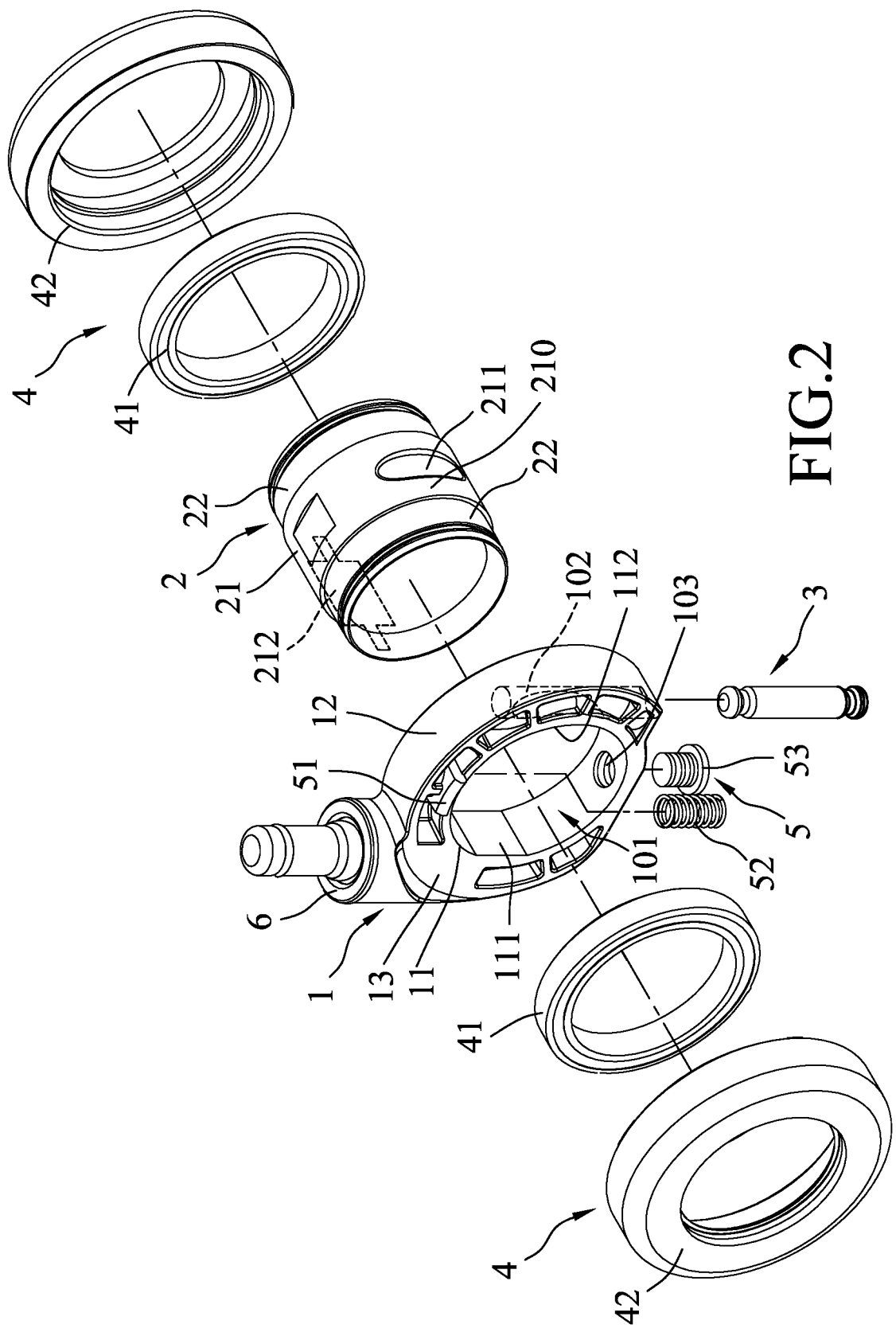
FIG. 2 is an exploded perspective view of the embodiment.
Figure 3:
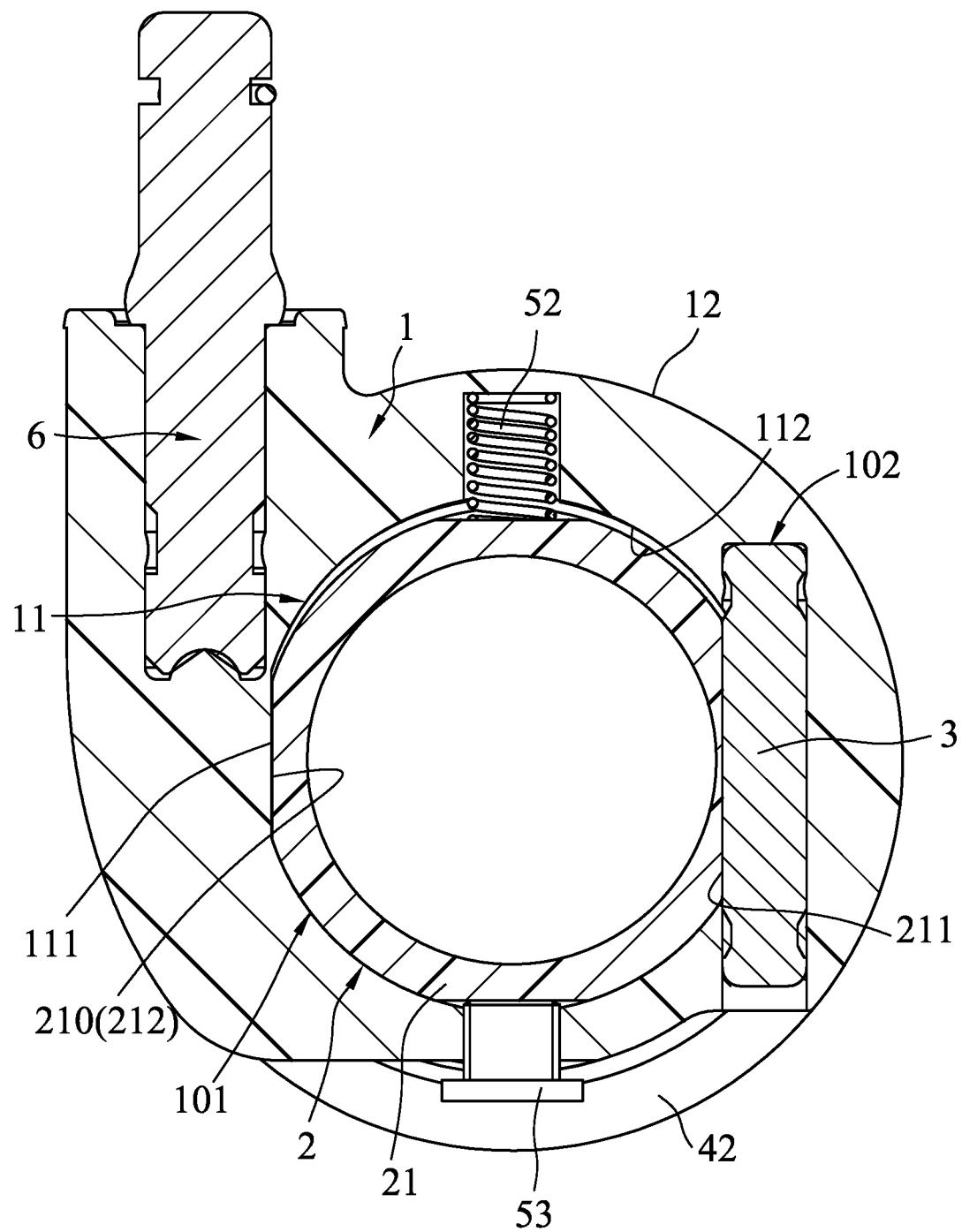
FIG. 3 is a side sectional view of the embodiment.
Figure 4:
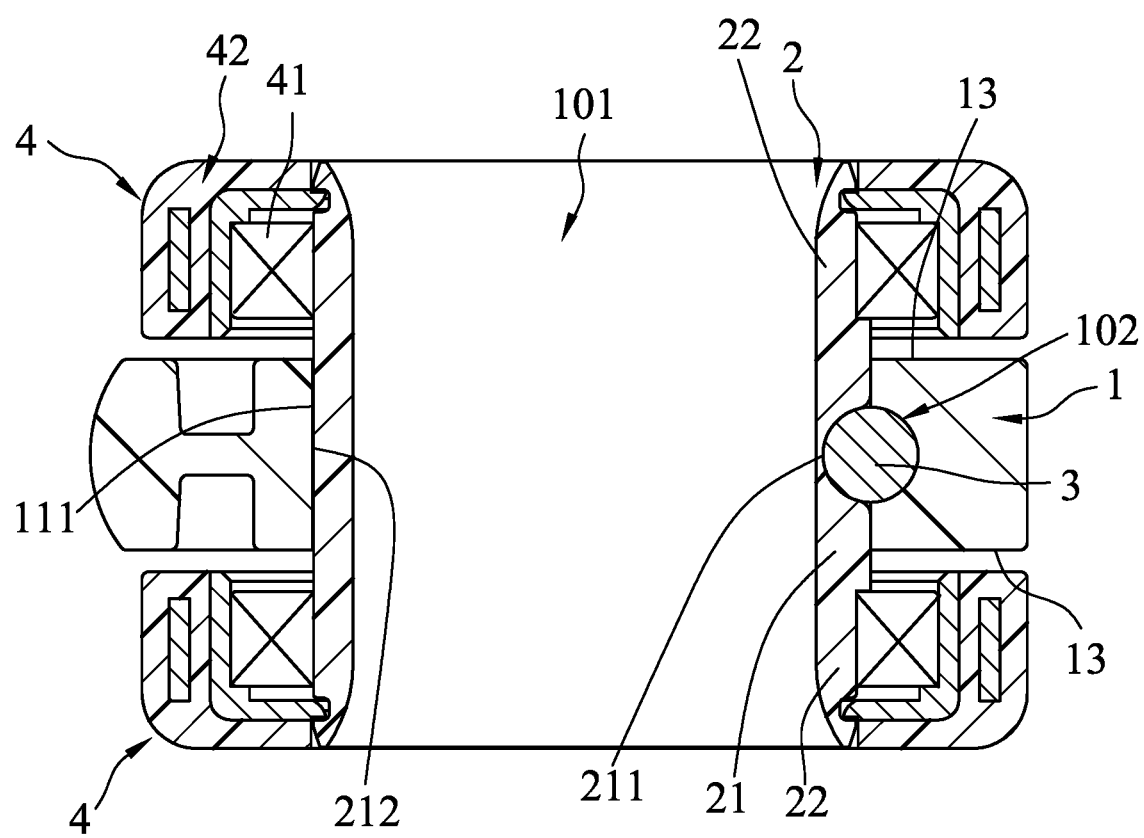
FIG. 4 is a top sectional view of the embodiment.
Figure 5:
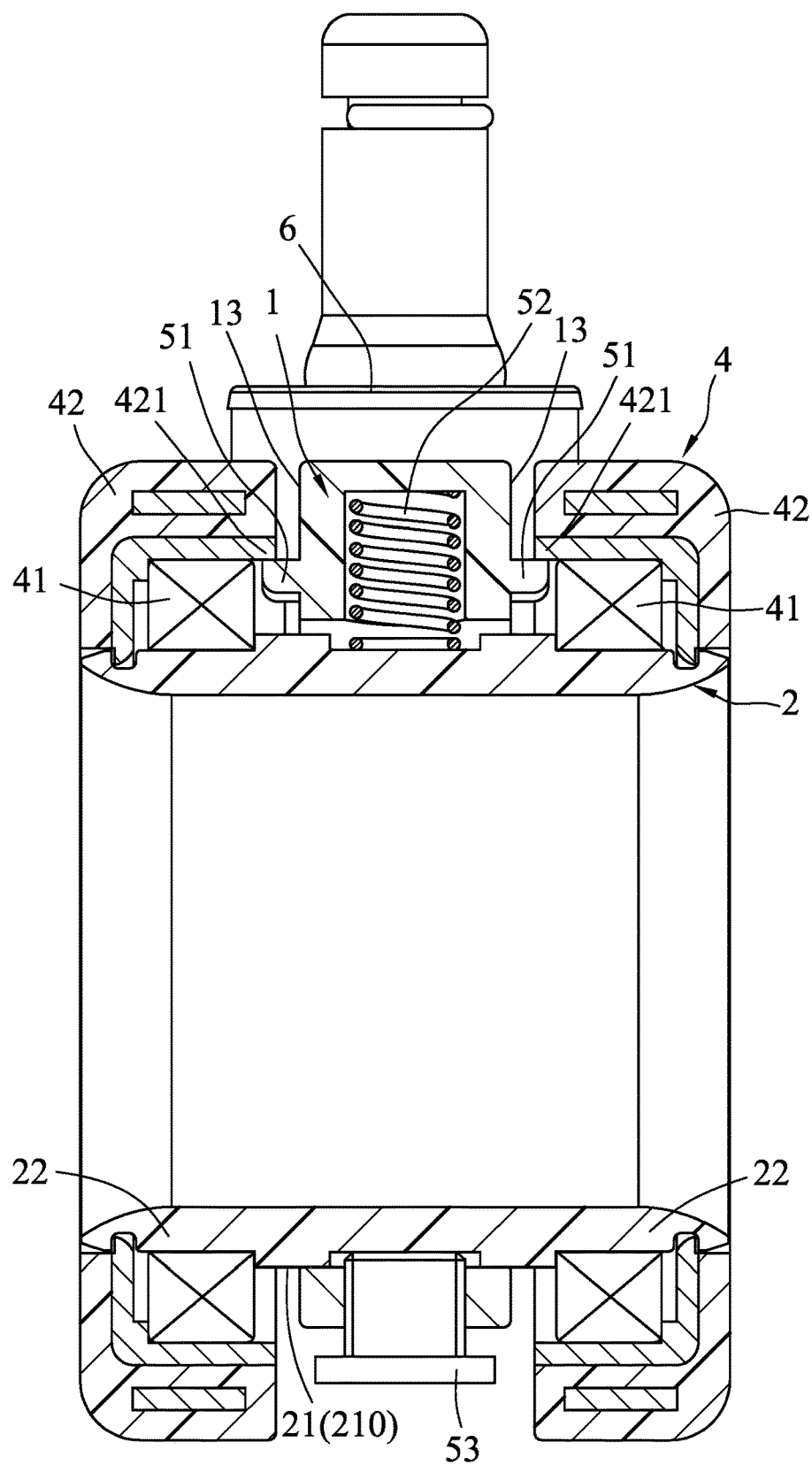
FIG. 5 is another side sectional view of the embodiment taken from another angle, illustrating a base body in a first position.
Figure 6:
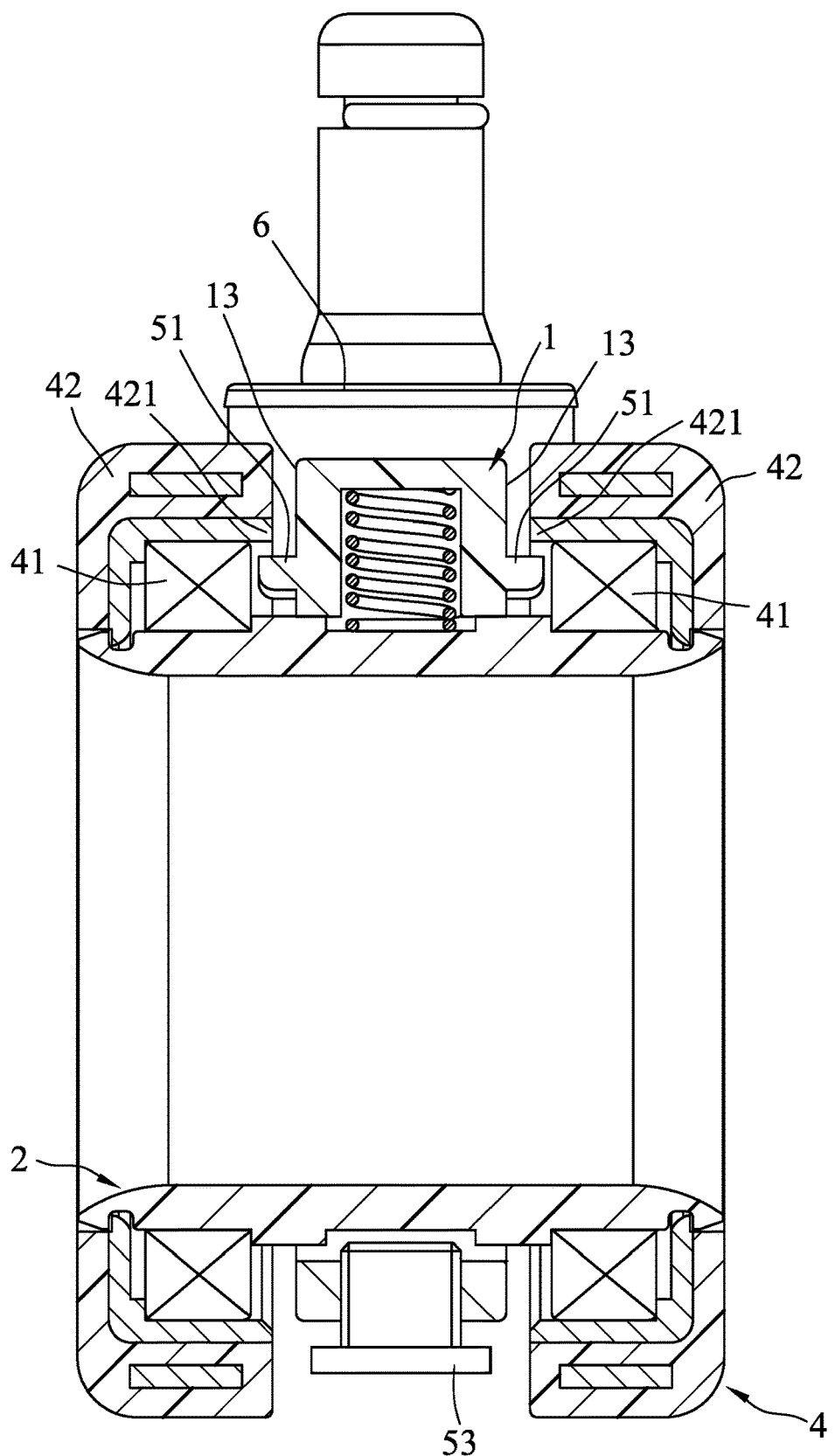
FIG. 6 is a view similar to FIG. 5, but illustrating the base body in a second position.

Referring to FIGS. 5 and 6, in combination with FIG. 2, the wheel units 4 are respectively and rotatably sleeved on the lateral connection portions 22 of the tubular member 2. Each wheel unit 4 includes a wheel 42 rotatably sleeved on a respective one of the lateral connection portions 22 and proximate to one of the side walls 13 of the base body 1, a bearing 41 disposed between the wheel 42 and a corresponding one of the lateral connection portions 22, and a brake rim 421 disposed within the wheel 42, proximate to the bearing 41 and protruding toward the base body 1.

The stopping unit 5 includes two brake members 51 protruding integrally, outwardly and respectively from the side walls 13 in two axially opposite directions for respectively engaging the brake rims 421 of the wheel units 4, a resilient member 52 disposed resiliently between the tubular member 2 and the base body 1, and an adjuster 53 threadedly extending through the threaded hole 103 and abutting the outer circumferential surface 210 of the fixing portion 21 of the tubular member 2 for upwardly pushing the fixing portion 21. Specifically, the resilient member 52 biases the tubular member 2 to move downward relative to the base body 1, such that the wheels 42 also move downward relative to the base body 1. Through this, the brake rims 421 can respectively engage the brake members 51.

The base body 1 is movable relative to the tubular member 2 between a first position (see FIG. 5) and a second position (see FIG. 6). In the first position, the brake members 51 respectively engage the brake rims 421 to prevent rotation of the wheel units 4 relative to the tubular member 2. When the base body 1 is moved downwardly by an external force and overcomes a resilient force of the resilient member 52 disposed between the base body 1 and the tubular member 2, the base body 1 is moved from the first position to the second position. At this time, the brake members 51 respectively disengage from the brake rims 421 to allow rotation of the wheels 42 relative to the tubular member 2, and the resilient member 52 is compressed to store a restoring force. When the external force is released from the based body 1, the restoring force of the resilient member 52 is released, and urges the base body 1 to move upward and restore to the first position.

Figure 7:
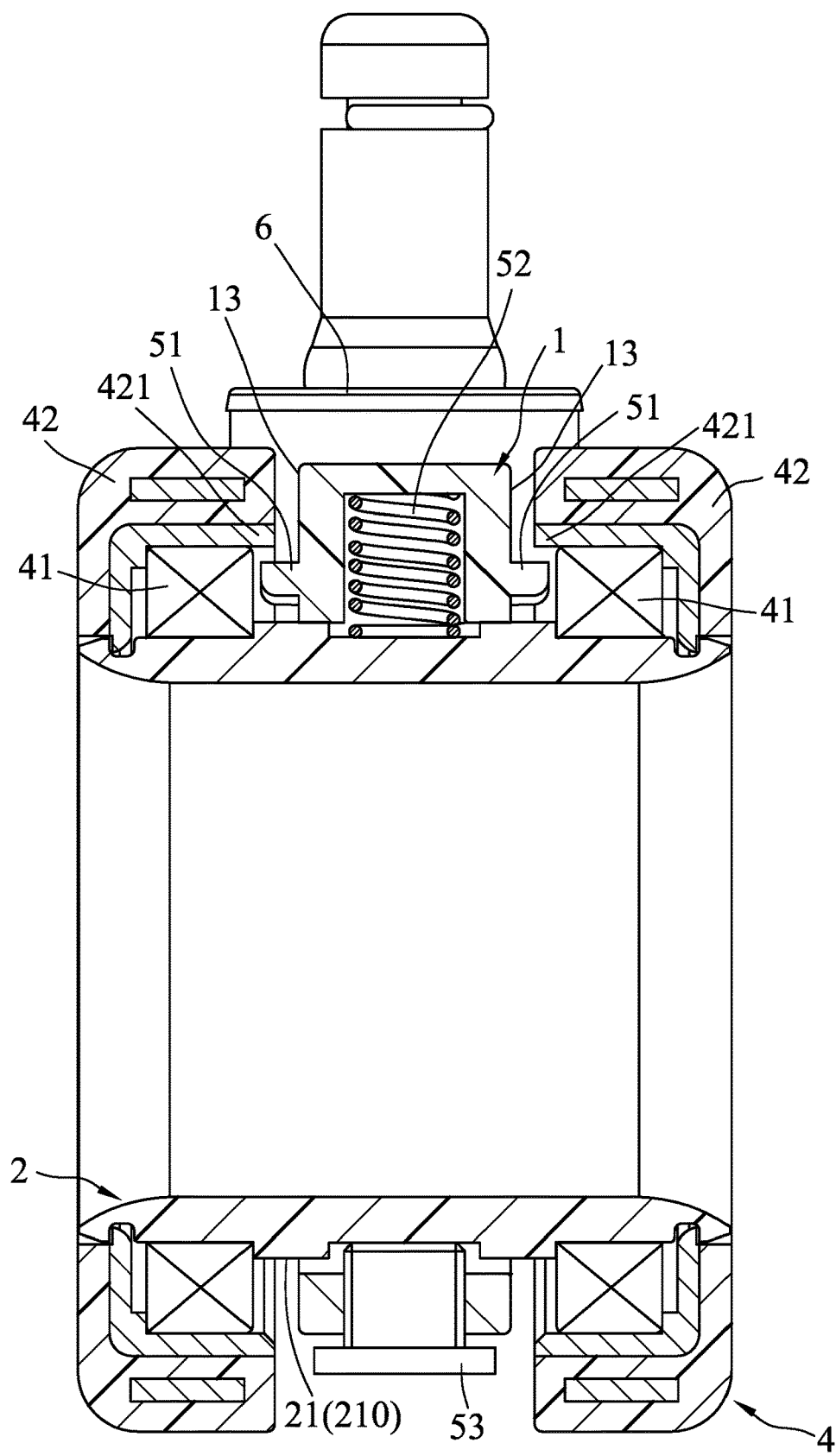
FIG. 7 is a view similar to FIG. 5, but illustrating an adjuster being adjusted to move upward and abut against a tubular member to place the base body in the second position.

Referring to FIG. 7, the adjuster 53 is threaded to the threaded hole 103 of the base body 1, and radially abuts against the outer circumferential surface 210 of the fixing portion 21. The adjuster 53 is located directly below the resilient member 52, and is rotatable relative to the base body 1 to push upwardly the fixing portion 21. As such, the fixing portion 21 can overcome the resilient force of the resilient member 52, can move upward relative to the base body 1 so as to release the brake rims 421 from the brake members 51 and so as to adjust a clearance between the fixing portion 21 and the inner surrounding surface 11 of the base body 1, thereby moving the base body 1 to the second position.

The mount seat 6 is integrally connected to the outer surrounding surface 12 of the base body 1 for mounting to a piece of furniture (not shown). Since there are many types of the mount seat 6 for mounting to the piece of furniture, and since the mount seat 6 is not an important aspect of this disclosure, a detailed description thereof is omitted herein.

In assembling the caster assembly 100, since the mount seat 6 is integrally connected to the base body 1, the tubular member 2 is first inserted into the through hole 101 such that the rotation-prevention plane section 212 of the fixing portion 21 faces and is aligned with the flat section 111 of the inner surrounding surface 11 and such that the lateral connection portions 22 of the tubular member 2 respectively extend out of the base body 1. Subsequently, the retaining member 3 is inserted into the positioning slot 102 so that the tubular member 2 cannot move left and right and cannot rotate relative to the base body 1. Finally, the wheel units 4 are respectively sleeved on the lateral connection portions 22, thereby accomplishing the assembly of the caster assembly 100.

It should be noted herein that the tubular member 2 cannot axially move and rotate within the through hole 101 through the fixing engagement of the retaining member 3 with the positioning slot 102 and the receiving groove 211, and through the abutment between the flat section 111 and the rotation-prevention plane section 212. However, in practice, the flat section 111 and the rotation-prevention plane section 212 may be omitted without affecting the positioning of the tubular member 2 with the base body 1.

To use the mount seat 6 of this disclosure, it is mounted to a bottom end of the piece of furniture, such as, but not limited to, a chair leg. A user can first rotate the adjuster 53 upward or downward to abut against the fixing portion 21 of the tubular member 2 or not. When the adjuster 53 is adjusted to abut against the fixing portion 21, the fixing portion 21 compresses the resilient member 52, and the base body 1 can be maintained in the second position. At this time, the caster assembly 100 does not have a brake function.

When the adjuster 53 is adjusted not to abut against the fixing portion 21, the resilient force of the resilient member 52 is designed to sufficiently support a weight of the piece of furniture. Therefore, when the piece of furniture is not loaded with any heavy object, the resilient member 52 can maintain the base body 1 in the first position. When the piece of furniture is loaded with a heavy object, the weight of the heavy object is transmitted from the mount seat 6 to the base body 1, so that the base body 1 moves downward relative to the tubular member 2 to the second position and compresses the resilient member 52, thereby allowing the wheel units 4 to rotate relative to the tubular member 2. For example, the piece of furniture is a chair. When the user sits on the chair, the base body 1 is moved to the second position, and the user can slide the chair through the wheel units 4. When the user leaves the chair, the base body 1 is moved upward to the first position, in which the brake members 51 and the brake rims 421 are engaged to each other that prevent rotation of the wheel units 4, so that the chair is immobilized.

Additionally, the stopping unit 5 and the brake rims 421 may be omitted in practice. If the caster assembly 100 is not provided with the stopping unit 5, the wheel units 4 can rotate relative to the tubular member 2 without brake function.

In summary, the advantages of the caster assembly 100 reside in that: with the retaining member 3 being positioned in the receiving groove 211 and the positioning slot 102, the tubular member 2 cannot move left and right and cannot rotate relative to the base body 1, thereby replacing the conventional hollow caster assembly which have the tubular member and the base body made of resilient materials and deformably engage with each other. Thus, the caster assembly 100 is not only convenient to assemble, but also the tubular member 2 and the base body 1 thereof can be made from non-resilient materials to increase its strength. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A caster assembly, comprising:
    a base body including an inner surrounding surface, a through hole extending through said base body and surrounded by said inner surrounding surface, and a positioning slot extending along a line tangent to said inner surrounding surface and communicating with said through hole;
    a tubular member inserted into said through hole, and including a fixing portion connected to said inner surrounding surface, and two lateral connection portions respectively extending from two opposite ends of said fixing portion and exposed from said base body, said fixing portion having an outer circumferential surface and a receiving groove indented into said outer circumferential surface and communicating with said positioning slot;
    a retaining member inserted into said positioning slot and partially and engagingly received in said receiving groove to retain said tubular member within said through hole; and
    two wheel units respectively and rotatably sleeved on said lateral connection portions.

2. The caster assembly as claimed in claim 1, wherein said base body further includes an outer surrounding surface surrounding said inner surrounding surface, said positioning slot having a bottom end disposed at a bottom of said outer surrounding surface and extending upward from said bottom of said outer surrounding surface.

3. The caster assembly as claimed in claim 2, wherein:
    said inner surrounding surface of said base body has a flat section opposite to said positioning slot; and
    said outer circumferential surface of said fixing portion has a rotation-prevention plane section abutting against said flat section.

4. The caster assembly as claimed in claim 2, wherein:
    said base body further includes two axially opposite side walls each connected between said inner and outer surrounding surfaces;
    said caster assembly further includes a stopping unit, said stopping unit including two brake members respectively and outwardly protruding from said side walls in two axially opposite directions, and a resilient member disposed between said tubular member and said base body;
    each of said wheel units includes a brake rim engageable with one of said brake members; and
    said base body is movable relative to said tubular member between a first position, where said brake rims of said wheel units respectively engage said brake members to prevent rotation of said wheel units, and a second position, where said brake rims of said wheel units respectively disengage from said brake members to allow rotation of said wheel units, said resilient member urging said base body to move to the first position.

5. The caster assembly as claimed in claim 4, wherein:
    each of said wheel units further includes a wheel disposed around one of said lateral connection portions of said tubular member and proximate to one of said side walls of said base body, and a bearing disposed between said wheel and the one of said lateral connection portions; and
    each of said brake rims is disposed within said wheel of a respective one of said wheel units and is proximate to said bearing of the respective one of said wheel units, and protrudes toward said base body.

6. The caster assembly as claimed in claim 4, wherein said stopping unit further includes an adjuster threadedly extending through said base body and abutting said outer circumferential surface of said fixing portion of said tubular member; and
    said adjuster is rotatable relative to said base body to move said base body to the second position relative to said fixing portion and to adjust a clearance between said fixing portion and said inner surrounding surface of said base body.

7. The caster assembly as claimed in claim 1, wherein each of said wheel units further includes a wheel disposed around one of said lateral connection portions of said tubular member, and a bearing between said wheel and the one of said lateral connection portions.

\* \* \* \* \*